[11] 3,602,640

[72] Inventors Michele Leblanc, La Norville, both of, France
[21] Appl. No. 817,136
[22] Filed Apr. 17, 1969
[45] Patented Aug. 31, 1971
[73] Assignee Compagnie Generale D'Electricite Paris, France
[32] Priority Apr. 25, 1968
[33] France
[31] 149535

[54] LASER FIBER OPTIC SCANNING DEVICE
8 Claims, 10 Drawing Figs.
[52] U.S. Cl. .................................................. 178/7.1, 178/DIG. 2, 250/227, 350/96 B
[51] Int. Cl. .................................................. H04n 3/08
[50] Field of Search............................................ 350/96 B; 250/227; 178/6 LC, 7.1

References Cited
UNITED STATES PATENTS

| | | | |
|---|---|---|---|
| 3,167,612 | 1/1965 | Strickholm.................. | 178/7.1 |
| 3,249,692 | 5/1966 | Clay et al..................... | 178/6 LC |
| 3,401,232 | 9/1968 | Goldhammer et al. ....... | 178/6 LC |

*Primary Examiner*—Robert L. Griffin
*Assistant Examiner*—Donald E. Stout
*Attorney*—Sughrue, Rothwell, Mion, Zinn and Macpeak ABSTRACT: A line-sequential television camera device is disclosed which has a detector such as a photomultiplier or similar device linked to an optical reception device by a cluster of optical fibers. The input faces of the optical fibers lie along part of a line limited by the intersection of the focal plane and the scanning plane of a laser beam. The output surfaces of the optical fibers are assembled at the front of the detector.

LASER FIBER OPTIC SCANNING DEVICE

BACKGROUND OF THE INVENTION

1. Field of the Invention

The present invention concerns television camera devices in which the image is analyzed by successive illumination of the points of an object by a light beam such as, for example, a laser beam.

2. Description of the Prior Art

It is known in the prior art to optically scan the ground below an aircraft for purposes of aerial mapping and the like. In an active system, a laser beam may be caused to scan the ground in a direction perpendicular to the direction of flight. The backscattered light is focused on the receiving surface of a detector such as a photomultiplier. The resulting signal may be used to modulate the brightness of a television display to provide a visual display of the terrain being mapped.

While, in general, these devices have performed satisfactorily, they suffer a number of disadvantages chief among which is an appreciable background noise level due to the fact that the photomultiplier is not capable of discriminating between echoes due to the scanning laser and parasitic echoes.

SUMMARY OF THE INVENTION

The present invention has for its principle object to provide a system in which a device for detecting the light echoes is of reduced size and in which the spurious echoes due to the various points of the image situated in the scanning line of the light beam and the spurious echoes due to partially transparent or diffusing obstacles which may be situated in the path of the light beam directed towards the object to be illuminated are eliminated.

The present invention concerns a camera device for use in line-sequential television, which is distinguished notably by the fact that it comprises a means for scanning the view to be televised point by point along a line by means of a laser beam. An optical device concentrates the light diffused by the points of the line illuminated by the laser beam along a focal line parallel to the aforesaid line. There is further provided a bundle of optical fibers whose inlet faces are disposed along the focal line and whose outlet faces are assembled to form a portion of an arc of a circle. A photosensitive cell is disposed opposite an outlet face of a light duct actuated with a rotational movement about an axis extending through the center of its outlet face, so that its inlet face successively sweeps all the outlet faces of the optical fibers, and a coupling device synchronizes the scanning movement of the laser beam and the rotational movement of the optical duct.

BRIEF DESCRIPTION OF THE DRAWING

Further features of the present invention will become apparent in the course of the following description, with reference to the accompanying drawings, which are given purely by way of illustration and have no limiting character, and in which.

DESCRIPTION OF THE PREFERRED EMBODIMENTS

Figure 1:
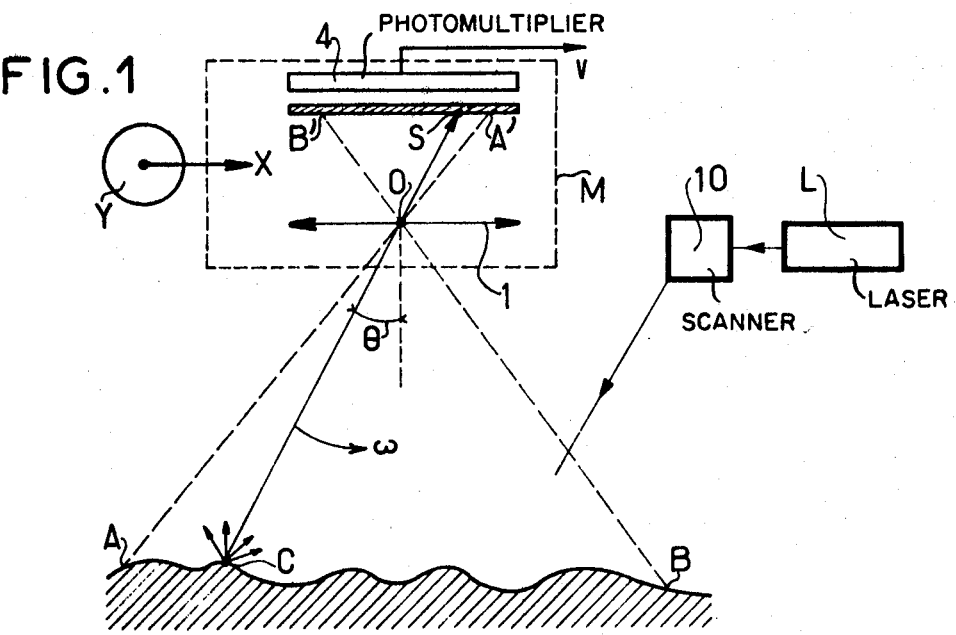
FIG. 1 diagrammatically illustrates a known television camera device.

FIG. 1 diagrammatically illustrates the principle of the picking-up of images by scanning by means means of a laser beam.

A craft, for example an aircraft, diagrammatically shown at M moves in the direction indicated by the axis Y perpendicular to the plane of the figure, the profile of the ground in the plane of the figure being represented by the line A–B. A light beam transmitter, for example a laser L, which is separately represented in the figure in order to simplify the drawing, is provided with a device 10, for example a rotating mirror, which enables it to scan the ground in the plane of the figure, at an angular velocity $\omega$. Each point of the ground diffuses a variable amount of light, which returns and is focused in the focal plane A' B' of an optical system O disposed on the craft M.

Consequently, when the light beam has scanned the line A B, the light echoes can scan the line A' B' to give dots such as S, the luminous intensity of which will be a function of the optical characteristics of the objects C illuminated by the light beam.

Figure 3:
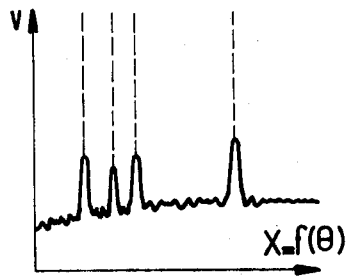
FIG. 3 is a curve representing the signals.

The focal plane A' B' is represented by the receiving surface of a detector, for example a photomultiplier which supplies at its output a voltage $v$ whose variation as a function of the value of the abscissa $x$ is shown in FIG. 3.

Figure 2:
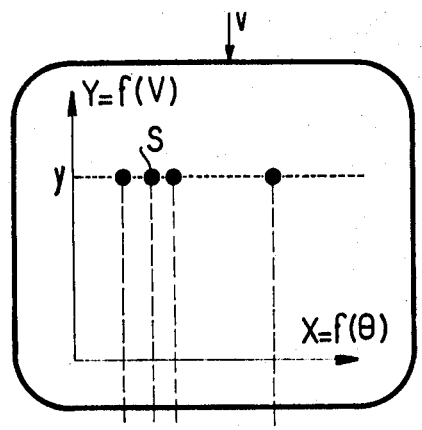
FIG. 2 illustrates the television screen on which the signals given by the device according to FIG. 1 are received.

The output voltage $v$ is applied to the brightness modulation input of a television screen shown in FIG. 2. The horizontal scanning of the television screen is synchronized with the scanning $x = f(\theta)$ of the illuminating beam, and there is therefore obtained on each line a luminous intensity in accordance with the curve of FIG. 3. The vertical scanning Y of the television screen is synchronized with the advance of the craft M along the axis Y.

There is then obtained on the screen a representation of the ground or of the craft M.

The above-described known system has many defects, the most important of which is appreciable background noise due to the fact that the photomultiplier is incapable of discriminating the echoes due to the scanning by the laser beam of all the other parasitic echoes received at a given instant from all the points of the ground which are situated in the scanning plane of the laser beam. In order to have a wide scanning angle, the existing optical systems give too wide a scanning in the focal plane, and the existing photomultipliers have an active surface which is distinctly smaller than the surface swept in the focal plane.

The present invention proposes to obviate the disadvantages due to the disproportion between the length A' B' and the active surface of the photomultiplier.

Figure 4A:
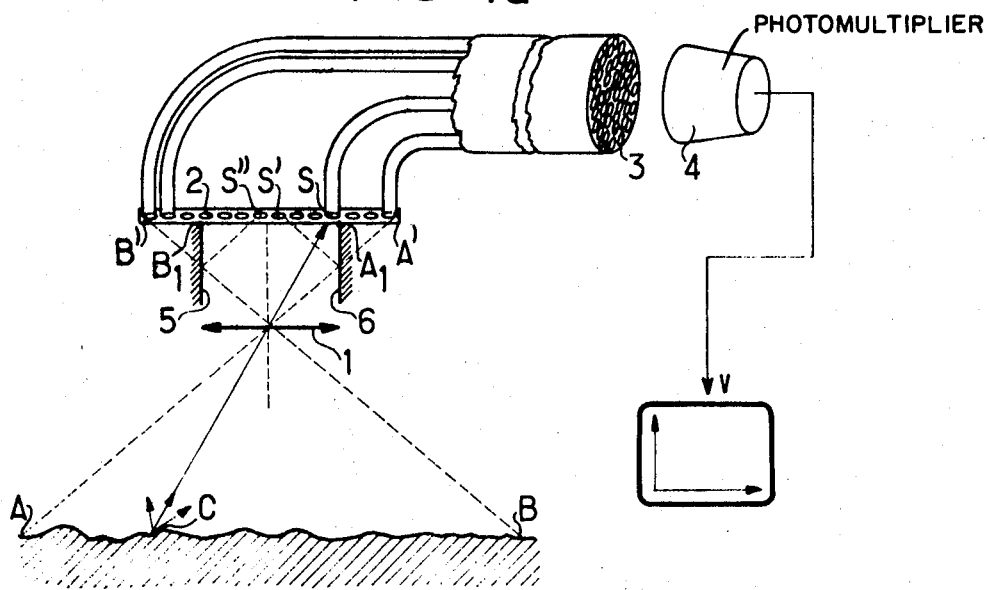
FIGS. 4a, 4b, 4c and 4d diagrammatically illustrate embodiments of a device according to the invention.

In accordance with a first embodiment of the invention, which is illustrated in FIG. 4a, the receiver comprises in the focal plane of an optical device 1 a pickup device consisting of the ends 2 of a plurality of optical fibers, these ends being aligned on the straight-line segment A' B'. The fibers are thereafter assembled to form a compact bundle, of which the end 3 is disposed opposite a photomultiplier 4 of relatively small dimensions.

In order to obtain a further reduction of the necessary diameter of the photomultiplier, there are provided two mirrors 5 and 6 which bring the extreme light echoes to the central position of the alignment A' B' of the ends 2 of the optical fibers.

This makes it possible to omit the fibers whose ends are disposed on the segments A A' and $B_1$ B', which results in a reduction of the diameter of the end 3 of the bundle of fibers.

However, in order that the light rays may effectively penetrate into the fibers, it is necessary for the inlet face of the fibers to be appropriately oriented. For this purpose, the fibers will be collected in the form of bundles having an orientation which will be a function of the angle of incidence of the rays formed by the optical system 1. This is diagrammatically illustrated in FIG. 4b, in which bundles each comprising, for example, two fibers 2' 2" are shown.

However, this solution is not sufficient when additional mirrors such as 5 and 6 in FIG. 1 are used, because the outermost rays reflected by the mirror will have an entirely different orientation from the rays which have directly passed through the optical system 1. In order to obviate this disadvantage, there is provided a second layer of fibers, of which the orientation will correspond to the rays reflected by the mirrors 5 and 6.

Figure 4B:
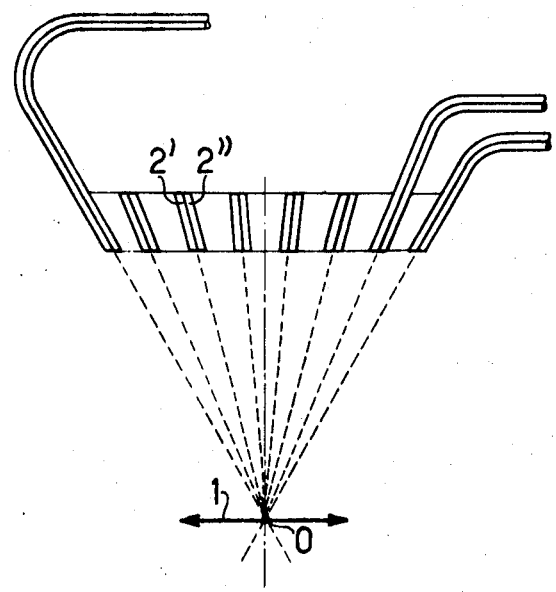
Figure 4C:
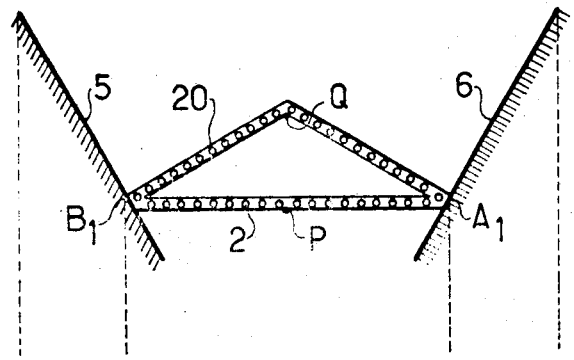
Figure 4D:
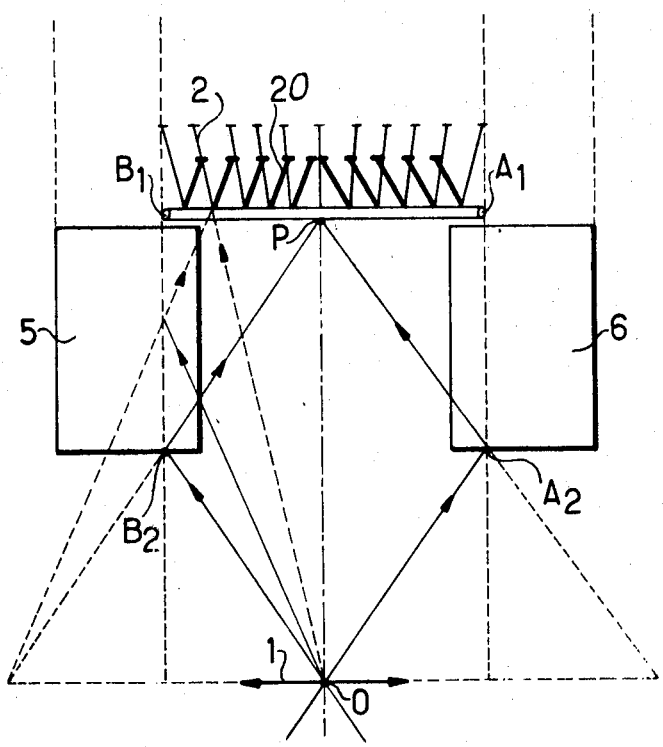

In order to separate the rays reflected by the mirrors 5 and 6, these mirrors are inclined about an axis parallel to the axis OP of the known optical system 1 shown in FIG. 4c and FIG. 4d.

FIG. 4d illustrates the device in the same plane as that of FIGS. 4a and 4b, while FIG. 4c is a sectional view along the plane perpendicular to the axis OP.

The embodiment of FIGS. 4c and 4d utilize mirror reflecting surfaces 5 and 6 that are relatively inclined as compared to the embodiments disclosed in FIGS. 4a and 4b.

The light rays which do not encounter the mirrors 5 and 6 go directly to the inlet faces of the fibers disposed on the line $A_1 \, P \, B_1$, while the rays which encounter the mirrors 5 and 6 along the lines $A_1 \, A_2$ and $B_1 \, B_2$ are reflected and are incident upon the inlet faces of a second layer of fibers, these latter faces being disposed in the planes defined by the lines $A_1 \, Q$ and $B_1$ shown in FIG. 4c. In these figures, the orientation of the fibers of the layer $A_1 \, P \, B_1$ is shown by short lines 2 and the orientation of the fibers of the layer $A_1 \, Q \, B_1$ are shown by the longer lines.

In another embodiment of the present invention, the receiver comprises means for suppressing the spurious echoes due to the points of the ground situated on either side of the point illuminated at a given instant by the laser beam.

In accordance with the present invention, there is disposed between the end 3 of the bundle of fibers and the photomultiplier 4 a movable pickup device by which it is possible to render effective only the fibers corresponding at a given instant to the position of the point on the ground which is illuminated by the laser beam.

Figure 5:
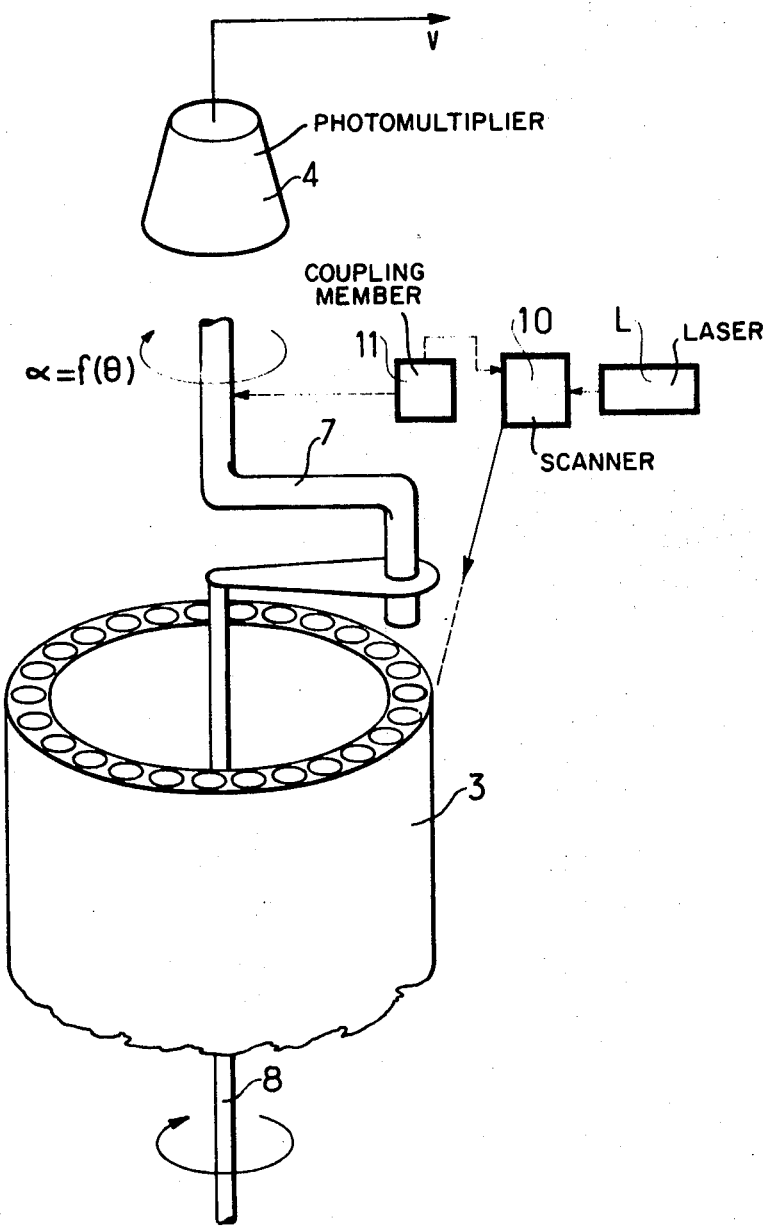
FIG. 5 illustrates the detail of a variant of the invention.

In accordance with a particular practical embodiment as illustrated in FIG. 5, the movable pickup device consists of one or more flexible light ducts 7, of which one end is fixed in relation to the photomultiplier, and of which the other end is movable and successively sweeps all the ends 3 of the bundle of fibers.

The rotational movement of this movable pickup is synchronized with the scanning movement of the laser beam. For example, the device 10 for effecting scanning by means of the beam emitted by the laser L is connected by a coupling member 11 to the means by which the optical duct 7 is rotated.

In accordance with a preferred embodiment, the ends 3 of the optical fibers are disposed along a circle, the movable end of the light circuit being driven, for example, by an arm disposed on a shaft 8 rotating synchronously with the scanning of the ground by the laser beam.

At each instant, the movable end of the duct 7 is situated opposite the fiber or fibers corresponding to the position S of the light echo, so that it is possible to suppress the spurious echoes picked up by the other fibers.

Figure 6:
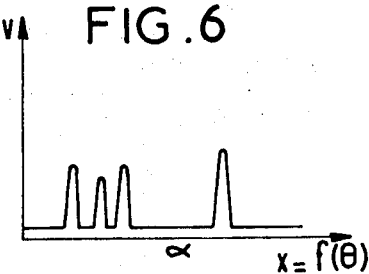
FIG. 6 is a curve similar to that of FIG. 3, obtained with the device according to the invention.

The background noise thus being greatly reduced, if not suppressed, there is obtained at the output of the photomultiplier a voltage curve having the form illustrated in FIG. 6.

Figure 7:
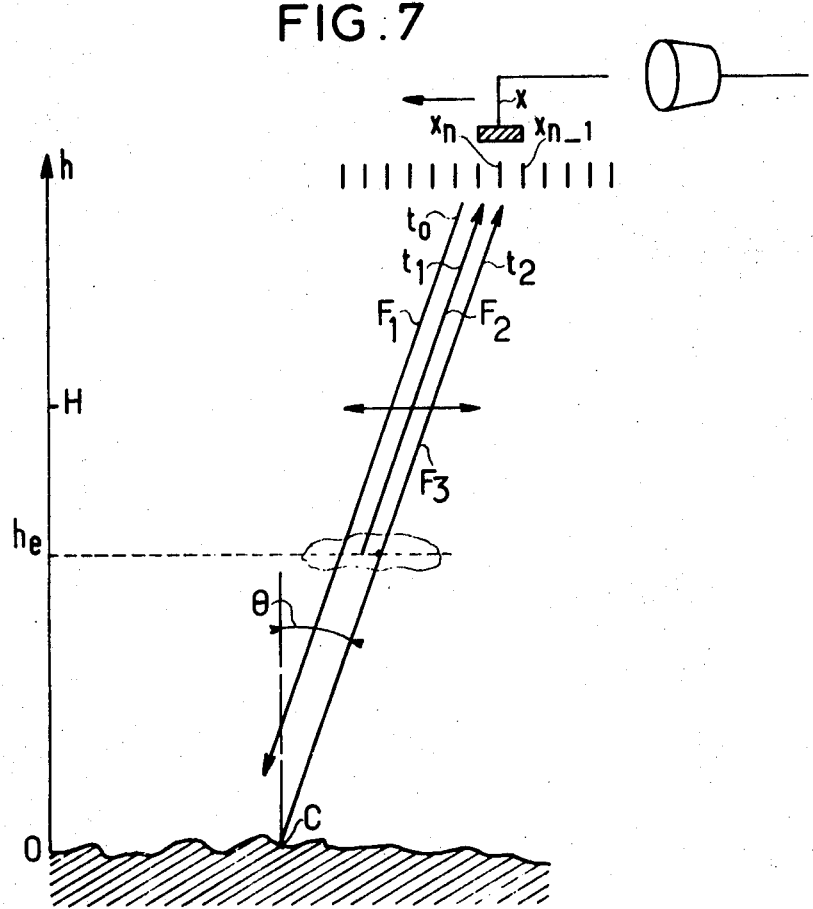
FIG. 7 is a diagram illustrating the operation of the device according to the invention.

FIG. 7 is a diagrammatic illustration of the system according to the invention.

Each of the fibers of the bundle is represented by a line such as $x_n, x_{n-1}$, etc., the movable pickup member being represented by the device $x$.

There are plotted along the ordinates the altitude H of the craft from which the mapping takes place, and the maximum altitude $h_e$ of the objects of which it is desired to have a representation on the screen.

The arrow $F_1$ diagrammatically represents the illuminating laser beam emitted at the time $t_0$. The arrow $F_2$ represents a spurious echo ray diffused, for example, by a cloud which, however, allows the passage of a portion of the incident ray $F_1$ which reaches the craft at an instant $t_1$.

That portion of the ray $F_1$ which has passed through the cloud is diffused by the object under consideration which is situated on the ground and gives rise to an echo represented by the arrow $F_3$, which reaches the craft at the instant $t_2$.

It will be assumed that the scanning speed of the laser beam is high enough for the influence of the movement of the craft to be negligible. The spurious echo emanating from a given direction (that of C will reach the pickup at an instant $t_1$ preceding the instant $t_2$ of the arrival of the image echo emanating from the same direction. The interval of time between $t_1$ and $t_2$ is equal to:

$$\Delta t = \frac{2(H-h_e)}{\cos\theta . C} - \frac{2H}{\cos\theta . C} = \frac{2h_e}{C.\cos\theta}$$

$\theta$ being the angle defining the direction of the beam,
$C$ being the velocity of light,
$h_e$ being the altitude of the object which creates spurious echoes, and
$H$ being the altitude of the craft on which the camera device is disposed.

In order to suppress the spurious image, it is therefore necessary for the movable pickup to reach the fiber $x_n$, corresponding to the direction of the object $C$, after the arrival of the spurious echo, but before the arrival of the echo of the image $C$, and for the movable pickup to remain on the fiber $x_n$ until the image of $C$ reaches $x_n$.

In accordance with the present invention, the movable pickup $x$ is at any instant at a certain distance from the fiber $x_n$ so as to reach the latter only after the instant $t_1$.

On the other hand, this pickup must have a certain width $\Delta x$ at least equal to $\Delta x = \Delta t$. $V_x$, $V_x$ being the speed of movement of the movable pickup, so that at least a portion of the pickup is still on the fiber $x_n$ at the instant of the arrival of the echo of the object C.

On the other hand, it must be noted that the separation between spurious images and the correct images can be obtained only if the scanning speed of the illuminating beam is sufficiently high for the object to be illuminated during an interval of time which is distinctly shorter than the time $\Delta t$. The relative height of the optical reception device and the object which creates spurious echos must be sufficiently large to permit an attainable speed of movement $Vx$. For example with fibers having a diameter of 1 mm. with the optical reception device being at an attitude of 150 km, the movable pickup speed $Vx$ would be approximately 1 meter per second.

It is to be noted that the method of suppressing spurious echoes according to the invention may also serve to effect a selective exploration which takes account, for example, only of the echoes emitted in certain altitude bands.

Of course, the invention is in no way limited to the embodiment described and illustrated, which has been referred to only by way of example. More particularly, it is possible without departing from the scope of the invention to make modifications in detail, to change certain features or to replace certain means by equivalent means.

We claim:

1. A line-sequential television camera device comprising:
   a. means for scanning the view to be televised point-by-point along a line by a laser beam,
   b. an optical device concentrating the light diffused by the points of the line illuminated by the laser beam along a focal line parallel to the said line,
   c. a bundle of optical fibers whose inlet faces are disposed along the said focal line and whose outlet faces are assembled to form a portion of an arc of a circle,
   d. a photosensitive cell disposed opposite an outlet face of a light duct actuated with a rotational movement about an axis extending through the center of its outlet face, so that its inlet face successively sweeps all the outlet faces of the said optical fibers, and e. a coupling device for synchronizing the scanning movement of the said laser beam and the rotational movement of the said optical duct.

2. The device according to claim 1, further comprising mirrors disposed to bring the outermost light beams towards the center of the segment of said focal line thereby reducing the length of the said line portion along which the inlet faces of the fibers are disposed.

3. The device according to claim 1, wherein the said fibers are so oriented that the light beams are substantially normal to the inlet faces.

4. The device according to claim 2, wherein the said mirrors are so disposed as to be perpendicular to the scanning plane of the said laser beam and parallel to the optical axis of the device.

5. The device according to claim 2, wherein the said mirrors are parallel to the optical axis of the device and inclined in relation to the normal to the said scanning plane, and further comprising a second layer of optical fibers being disposed and oriented in such manner that the rays reflected by the said mirrors are incident upon the inlet faces of the fibers at a substantially normal angle.

6. The device according to claim 1, wherein the transverse dimension of the inlet face of the said flexible light duct is at least equal to $(2h_e/C)V_x$, $h_e$ being the maximum altitude of the objects to be observed, $C$ the velocity of light and $V_x$ the speed of movement of the said inlet face of the light duct.

7. The device according to claim 1, wherein the scanning by the laser beam is effected at such a speed that the time taken by the beam to pass over a given point is distinctly greater than $2h_e/C$.

8. The device according to claim 1, further comprising means for synchronizing the rotation of said optical duct to the scanning of said laser beam.